(12) United States Patent
Kranz et al.

(10) Patent No.: US 8,088,239 B2
(45) Date of Patent: Jan. 3, 2012

(54) METHOD OF MANUFACTURING A LAMINATE OF POLYMERIC TAPES AS WELL AS A LAMINATE AND THE USE THEREOF

(75) Inventors: Bart Clemens Kranz, Volkel (NL); Jan Adolph Dam Backer, Son en Breugel (NL)

(73) Assignee: Novameer B.V., Veghel (NL)

( * ) Notice: Subject to any disclaimer, the term of this patent is extended or adjusted under 35 U.S.C. 154(b) by 944 days.

(21) Appl. No.: 11/887,759

(22) PCT Filed: Apr. 6, 2006

(86) PCT No.: PCT/NL2006/000179
§ 371 (c)(1),
(2), (4) Date: Dec. 18, 2007

(87) PCT Pub. No.: WO2006/107197
PCT Pub. Date: Oct. 12, 2006

(65) Prior Publication Data
US 2008/0274330 A1 Nov. 6, 2008

(30) Foreign Application Priority Data
Apr. 8, 2005 (NL) ...................................... 1028720

(51) Int. Cl.
*B32B 5/12* (2006.01)
*B32B 27/00* (2006.01)
*B32B 37/00* (2006.01)
*F41H 5/04* (2006.01)

(52) U.S. Cl. ........ 156/160; 156/164; 156/194; 156/196; 156/304.6

(58) Field of Classification Search .................. 156/160, 156/196, 164, 194, 304.6
See application file for complete search history.

(56) References Cited

U.S. PATENT DOCUMENTS

| 4,309,487 | A | | 1/1982 | Holmes |
| 4,857,127 | A | | 8/1989 | Mackley et al. |
| 4,931,126 | A | * | 6/1990 | McCarville et al. ....... 156/304.6 |
| 5,578,370 | A | | 11/1996 | Ferrar et al. |

FOREIGN PATENT DOCUMENTS

| EP | 1 277 573 A1 | 1/2003 |
| GB | 1 387 701 | 3/1975 |
| WO | WO 2006/047366 A1 | 5/2006 |

* cited by examiner

*Primary Examiner* — Brent O'Hern
(74) *Attorney, Agent, or Firm* — Oliff & Berridge, PLC

(57) ABSTRACT

A method of manufacturing a laminate of polymeric tapes is provided. Polymeric tapes of the core-cladding type are used, in which the core material has a higher melting temperature than the cladding material. The method includes pretensioning the polymeric tapes, and positioning the polymeric tapes and consolidating the polymeric tapes to obtain the laminate. The positioning is carried out in two, three, four or more planes. The polymeric tapes are arranged in each plane in a parallel, side-by-side relationship in a first direction, the polymeric tapes of each plane are offset in a second direction relative to the polymeric tapes in an adjacent plane, the second direction being substantially perpendicular to the first direction. The polymeric tapes of the laminate are unidirectionally arranged in a single direction in all of the two, three, four or more planes.

11 Claims, No Drawings

METHOD OF MANUFACTURING A LAMINATE OF POLYMERIC TAPES AS WELL AS A LAMINATE AND THE USE THEREOF

The present invention relates to a method of manufacturing a laminate of polymeric tapes, as well as to a laminate built up of unidirectionally arranged polymeric tapes. The present invention further relates to a panel built up of individual laminates, wherein the laminates are made up of unidirectionally arranged polymeric tapes. The present invention further relates to the use of such a panel.

U.S. Pat. No. 5,578,370 relates to a thermoplastic composite material comprising a molecularly-oriented thermoplastic polymer base having two sides, at least one of which is coated with a thermoplastic surface polymeric layer. This surface polymeric layer is bonded to the polymer base by molecular interspersion, in which the surface polymeric layer has a softening temperature lower than that of the polymer base. An example of the polymer base is polypropylene, in which both sides are coated with a surface layer of an ethylene-polypropylene copolymer, in which the molecular bonding between the surface layer and the polymer base is made by applying heat in order to weaken the surface layers. After cooling, the composite film thus made is then slit to form a tape, each tape consisting of a central polypropylene base or core having bonded thereto on each face thereof a surface layer of the ethylene-propylene copolymer, in which the tape thus formed is then drawn at a draw ratio of the order of 20:1 in order to effect molecular orientation of the polypropylene and increasing the strength of the tape itself.

From European patent application EP 1 277 573 a monoaxially drawn polyolefin multilayer tape or yarn of the AB or ABA type is known which substantially consists of a central layer (B) of a polyolefin selected from polyethylene and polypropylene, and one or two other layers (A) of a polyolefin from the same class as the material of the central layer B. The tape or yarn thus obtained can be used for manufacturing a cloth, with the material subsequently being heat treated and pressed. This heat treatment causes the individual fibres to be welded together, as a result of which the structural integrity of the cloth will be guaranteed. Such a cloth can be used as, for example, reinforcement in high pressure parts, such as pipes that are used in oil production. Other suitable applications are, for example, the automotive industry or the aviation industry, in which the originally used glass fibres are substituted for the cloth thus manufactured. The obtained materials, such as cloths, will invariably be made up of yarns or tapes arranged at right angles to each other, however, in order to obtain identical strength properties both in the x-direction and in the y-direction.

The object of the present invention is to manufacture a laminate of polymeric tapes, wherein a laminate having specific strength properties is obtained.

Another object of the present invention is to manufacture a panel built up of individual laminates, which panel has specific strength and weight characteristics.

Yet another object of the present invention is to provide a special use of such a panel, in which high-strength properties play an important part.

The method as referred to in the introduction is characterized in that polymeric tapes of the core-cladding type are used, in which the core material has a higher melting temperature than the cladding material, which method comprises the following steps:
 i) biassing the polymeric tapes,
 ii) positioning the polymeric tapes,
 iii) consolidating the polymeric tapes to obtain the laminate.

One or more of the aforesaid objects are achieved by using such a method.

In a special embodiment, the core material and the cladding material are preferably made of the same polymer, said cladding material in particular being a copolymer and the core material in particular being a reinforced homopolymer.

The biassing step i) means to initially tensioning the polymeric tapes, substantially to obtain polymeric tapes in an alignment configuration. The consolidating step iii) means the bonding of the polymeric tapes by melting the cladding material through an increase of the temperature, in which possibly by applying an increased pressure the polymeric tapes will adhere to each other. As examples for means for applying pressure rolls, calendar and double side conveyor press can be mentioned.

In a special embodiment of the present method, said positioning step ii) is carried out in a weaving machine, with the polymeric tapes being used as warp yarns and a twine having a thickness and a weight lower than those of the polymeric tapes being used as the weft yarn.

In another, preferred embodiment, it is moreover possible to carry out said positioning step ii) in a weaving machine, with the polymeric tapes being used as the weft yarn and a twine being used as the warp yarn.

The twine that is used for this purpose in particular has a melting temperature lower than or equal to the melting temperature of the cladding material of the polymeric tapes.

According to another embodiment, said positioning step ii) is preferably carried out by arranging the polymeric tapes parallel to each other and placing the thus arranged polymeric tapes into contact with a substrate layer, after which the polymeric tapes thus arranged on the substrate layer are subjected to step iii) as a whole for the purpose of bonding the substrate layer to the cladding material of the polymeric tapes.

Additional experiments carried out by the present applicant have shown in particular that said positioning step ii) is carried out by arranging the polymeric tapes in spaced-apart, parallel side-by-side relationship in a first plane, with the interspaces between the tapes being smaller than the width of the polymeric tapes, after, which polymeric tapes are arranged in spaced-apart, parallel side-by-side relationship in a second plane, in which position the interspaces in the first plane are covered up by the polymeric tapes in the second plane. Such a positioning arrangement can also be regarded as a "brickwork pattern", in which the polymeric tapes of each layer are "offset" relative to each other so as to provide a strong construction. It should be understood that the positioning step ii) is not limited to a specific number of layers, and that three, four or more planes can be stacked in such a "brickwork pattern". In such a brickwork construction the tapes of each plane and in each plane individually are arranged in parallel side-by-side relationship.

In a special embodiment, it is furthermore preferable if said positioning step ii) is carried out by arranging the polymeric tapes in parallel, side-by-side relationship, each polymeric tape abutting against the tape that is positioned adjacent thereto.

In a special embodiment, said positioning step ii) can also be carried out by arranging the polymeric tapes parallel to each other, each polymeric tape having an overlap with the polymeric tape that is positioned adjacent thereto. Such a construction can be indicated as a "roof tile pattern".

The substrate layer that is used is preferably made up of a polymer that bonds to the polymeric tapes, said substrate layer in particular being selected from the group consisting of film, foil, scrim fabric and nonwoven.

The present invention further relates to a laminate built up of unidirectionally arranged polymeric tapes in which polymeric tapes of the core-cladding type are used, the core material having a higher melting temperature than the cladding material, which polymeric tapes are bonded together via the cladding material.

In the present laminate it is in particular preferable if the core material and the cladding material are made of the same polymer, said cladding material in particular being a copolymer, and the core material in particular being a stretched homopolymer.

Preferably, the amount of core material in the present laminate ranges between 50 and 99 wt. % and the amount of cladding material ranges between 1 and 50 wt. %, based on the weight of the tape, said core material and said cladding material in particular being selected from the group consisting of polyethylene, polypropylene, polyamide, polybutadiene terephthalate and polyethylene terephthalate. In a specific embodiment it is preferred to use polyethylene, but polypropylene as well.

The present invention further relates to a method of manufacturing a panel built up of individual laminates, which laminates can be placed one on top of another and be pressed together to form a panel, using pressure and heat, using a laminate as described above.

The present invention further relates to a panel built up of individual laminates, which laminates are made up of unidirectionally arranged polymeric tapes of the core-cladding type, the core material having a higher melting temperature than the cladding material, wherein the laminates are stacked according to a configuration in which they are turned relative to each other, a so-called cross ply arrangement. Suitable configurations are 0-90-0, 0-0-90-90-0-0, but also 0-45-90-135-0. The term "unidirectional" means that the polymeric tapes are arranged in a unique direction, i.e. the longitudinal or length direction of the polymeric tape. If a laminate composed of unidirectionally arranged polymeric tape is used, one or more layers or planes of polymeric tapes are present in such a laminate, which tapes are arranged in the same direction.

In a special embodiment it is in particular preferable if the present panel is provided with a layer of an impact resistant material on one or on both surface sides, which impact-resistant material has preferably been selected from one or more of materials from the group consisting of metals, metal alloys, glass, basalt fibre, glass fibre, ceramics and aramid.

The present invention further relates to the use of the panel for antiballistic applications, in which connection in particular walls, doors, plates, vests, military applications such as tank and aeroplane bodies and aeroplane doors are to be considered.

Using the present method, a material is obtained which is in particular suitable for antiballistic applications, in which the material takes up the impact energy to which it is subjected with a high level of energy absorption.

A number of stacked-together laminates, also called UD, can be used for creating a nice and smooth surface in the case of products which are partially or entirely made of core-cladding tapes, also called self-reinforced polymer (SRP) (whether or not of woven fabrics). In addition to that, such laminates can be used for applications that are loaded much more heavily in one direction than in other directions. Furthermore, the present laminate can be used is SRP products in which especially the bond from layer to layer is significantly improved, because of the intense contact of the present laminate with another laminate in comparison with the contact of one fabric with another fabric. If use is made of a number of (more than one) layers of laminates arranged one on top of another, this laminate can be used as a very strong foil. Think in this connection of cloths, textiles, banners, sails, truck tarpaulins, etc. These applications require the (virtual) absence of stretch. In addition to that, pure UD can be used as floating lines or foils.

The present invention will be explained on basis of an example, which example is to be regarded as an illustration and not to limit the scope and spirit of the present invention.

EXAMPLE

A polymeric tape of the core-cladding type having a width of 3.0 mm and a height of 0.08 mm was used. The core material is a polypropylene homopolymer having a melting temperature higher than 170° C. and the cladding material is a polypropylene copolymer having a melting temperature higher than 120° C. On basis of the aforementioned polymeric tape a unidirectional cloth having a width of 1400 mm was manufactured, in which cloth the height thereof is constructed by two layers of polymeric tape resulting in a height of 0.16 mm. In each layer an amount of 467 polymeric tapes were positioned in such a way that the polymeric tapes are arranged in space-part, parallel side-by-side relationship over a width of 1400 mm. By applying a pre-stress or biassing step of for example 20 Newton per polymeric tape, the aforementioned polymeric tapes were positioned in an alignment configuration. The layer thus positioned was covered with an identical layer of 467 polymeric tapes, which polymeric tapes were positioned as mentioned before, in which the second layer was "offset" relative to the already positioned layer over a width of a half polymeric tape, i.e. 1.5 mm. According to such an embodiment, a combination of two, placed on top of each other, layers of polymeric tapes is made, in which such a stack construction is to be regarded as a "brickwork construction". The composite of the two layers thus obtained was consolidated under pressure and temperature, in which a temperature was applied which is higher than the melting temperature of the polypropylene copolymer, i.e. the cladding material of the polymeric tape. As a result a so-called consolidated cloth was obtained, which can be designated as UD 0 in practice. The cloth thus obtained was cut on a specific size, i.e. in the present embodiment on a length of 1400 mm, which layers subsequently as layers of UD 0 according to a 90° configuration on top of each other were stacked. In this embodiment a package according to the configuration 0-0-90-90 was laminated as a so-called cross ply under pressure and temperature. In order to obtain the desired panel the cross plies thus made were stacked in a configuration of 50 individual layers, after which the panel was obtained under a pressure of at least 2 bar and a temperature of 150° C., the panel having a thickness of about 16 mm. It is clear that the aforementioned way of positioning can also be carried out according to the embodiments as disclosed in the appended claims. In addition, it is to be noted that for manufacturing a cross ply one can also use 0-90, 0-90-90-0, 0-0-90-90, 90-90-0-0 configurations, and also a construction consisting of several layers, such as for example 0-0-0-90-90-90 and such.

The invention claimed is:
1. A method of manufacturing a laminate of unidirectionally arranged polymeric tapes of the core-sheath type, in which the core material has a higher melting temperature than the sheath material, the method comprising:
pretensioning the polymeric tapes, and positioning the polymeric tapes and consolidating the polymeric tapes to obtain the laminate, wherein the positioning is carried out in two, three, four or more planes, the polymeric tapes are arranged in each plane in a parallel, side-by-side relationship in a first direction, the polymeric tapes of each plane are offset in a second direction relative to the polymeric tapes in an adjacent plane, the second direction being substantially perpendicular to the first direction, and the polymeric tapes of the laminate are unidirectionally arranged in a single direction in all of the two, three, four or more planes.

2. A method according to claim 1, wherein at least part of the core material and at least a part of the sheath material comprise a same polymer.

3. A method according to claim 1, wherein the sheath material is a copolymer.

4. A method according to claim 1, wherein the core material is a drawn homopolymer.

5. A method according to claim 1, wherein the positioning is carried out in a weaving machine, with the polymeric tapes being used as warp yarns and a binding yarn having a thickness and a weight lower than those of the polymeric tapes being used as the weft yarn or with the polymeric tapes being used as the weft yarn and a binding yarn being used as the warp yarn.

6. A method according to claim 5, wherein the binding yarn has a melting temperature lower than or equal to the melting temperature of the sheath material of the polymeric tapes.

7. A method according to claim 1, wherein the positioning is carried out by arranging the polymeric tapes in a parallel side-by-side relationship and placing the thus arranged polymeric tapes into contact with a substrate layer, after which the polymeric tapes are consolidated as a whole for the purpose of bonding the substrate layer to the sheath material of the polymeric tapes.

8. A method according to claim 1, wherein the positioning is carried out by arranging the polymeric tapes in a spaced-apart, parallel side-by-side relationship in a first plane, with interspaces between the polymeric tapes being smaller than a width of the polymeric tapes, after which other polymeric tapes are arranged in the spaced-apart, parallel side-by-side relationship in a second plane, in which position the interspaces in the first plane are covered up by the polymeric tapes in the second plane.

9. A method according to claim 1, wherein the positioning is carried out by arranging the polymeric tapes in a parallel, side-by-side relationship, each polymeric tape abutting against the polymeric tapes that are positioned adjacent thereto.

10. A method according to claim 1, wherein the positioning is carried out by arranging the polymeric tapes in a parallel side-by-side relationship, each polymeric tape having an overlap with the polymeric tapes that positioned adjacent thereto.

11. A method of manufacturing a panel comprising laminates produced according to claim 1, wherein the laminates are placed one on top of another and pressed together to form a panel, using pressure and heat.

* * * * *